US009294896B2

(12) United States Patent
Shlaimoun (10) Patent No.: US 9,294,896 B2
(45) Date of Patent: Mar. 22, 2016

(54) METHOD AND SYSTEM FOR VIDEO MESSAGING

(76) Inventor: Zia Shlaimoun, Malibu, CA (US)

(*) Notice: Subject to any disclaimer, the term of this patent is extended or adjusted under 35 U.S.C. 154(b) by 211 days.

(21) Appl. No.: 13/542,641

(22) Filed: Jul. 5, 2012

(65) Prior Publication Data

US 2013/0010051 A1    Jan. 10, 2013

Related U.S. Application Data

(60) Provisional application No. 61/504,469, filed on Jul. 5, 2011.

(51) Int. Cl.
| | | |
|---|---|---|
| H04N 7/14 | (2006.01) | |
| H04W 4/18 | (2009.01) | |
| H04W 4/14 | (2009.01) | |
| H04L 12/58 | (2006.01) | |

(52) U.S. Cl.
CPC ............ *H04W 4/18* (2013.01); *H04L 51/10* (2013.01); *H04L 51/24* (2013.01); *H04W 4/14* (2013.01)

(58) Field of Classification Search
CPC .................................................. H04N 7/14
USPC .................... 348/14.01, 14.02, 14.12
See application file for complete search history.

(56) References Cited

U.S. PATENT DOCUMENTS

| | | | | |
|---|---|---|---|---|
| 6,895,215 | B2* | 5/2005 | Uhlmann | 455/3.01 |
| 2007/0067407 | A1 | 3/2007 | Bettis et al. | |
| 2008/0090553 | A1* | 4/2008 | Wan et al. | 455/413 |
| 2008/0109803 | A1* | 5/2008 | Fisher et al. | 717/175 |
| 2008/0288989 | A1 | 11/2008 | Zheng et al. | |
| 2009/0125638 | A1* | 5/2009 | Phippen et al. | 709/246 |
| 2011/0087971 | A1* | 4/2011 | Kamrani et al. | 715/752 |
| 2011/0135071 | A1* | 6/2011 | Milstein | 379/88.14 |
| 2011/0304685 | A1* | 12/2011 | Khedouri et al. | 348/14.02 |
| 2012/0096344 | A1* | 4/2012 | Ho et al. | 715/249 |

OTHER PUBLICATIONS

International Search Report and Written Opinion in Applicant's corresponding co-pending PCT International Application No. PCT/US2012/045631.

* cited by examiner

*Primary Examiner* — Olisa Anwah
(74) *Attorney, Agent, or Firm* — Lance M. Pritikin (57) ABSTRACT

Methods, systems and devices, including computer programs, for creating, storing, formatting and sending video messages from one mobile device to another. A video message is recorded by camera element on a first mobile device. A recipient identifier associated with a second mobile device is logged by way of input by the sender. An alert is transmitted to the second mobile device by way of the identifier, thereby providing notification that the video message is ready to view and presenting a selectable screen object to activate the video message. The operating system of the second mobile device is determined, and the video message is formatted for viewing compatibility with that operating system. The video message is then uploaded to and played on the second mobile device. A reply message may similarly be sent from the second mobile device to the first mobile device, without the need to input a recipient identifier.

4 Claims, 4 Drawing Sheets

METHOD AND SYSTEM FOR VIDEO MESSAGING

RELATED APPLICATIONS

This application claims the benefit of U.S. Provisional Application No. 61/504,469 filed Jul. 5, 2011, the content of which is incorporated by this reference in its entirety for all purposes as if fully set forth herein.

TECHNICAL FIELD

The present invention relates generally to systems and methods for transmitting messages between computer devices. More particularly, embodiments provide for the transmission of video messages between mobile devices, such as cell phones, tablets and the like.

BACKGROUND

While conventional means are available for creating a video file and sending it to a recipient for viewing on their own device, what is needed is a method or system which enables universal short and streaming video instant chat across divergent video formats and mobile devices, and through conventional data delivery networks that presently hinder the widespread adoption of video messaging on mobile devices.

SUMMARY

Exemplary embodiments of the present invention may allow consumers to create, deliver and view video messages on and between Internet-accessible mobile devices, such as mobile phones, tablets devices, computers, video game consoles, and other devices. Embodiments may therefore capture the essence of digital communication and improve the capabilities, effectiveness and efficiencies of text messages by merging text, email, voice and video to create an easy, fast and simple video messaging system, universally available and open to any person who has a computer, display mobile telephone, or tablet and connectivity to the World Wide Web. Further, exemplary embodiments improve text and voice messaging by enabling users to communicate via short or multi-party push-to-talk video on existing mobile device networks in an intuitive and universally compatible manner.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Referring now to the drawings, like reference numerals designate identical or corresponding features throughout the several views.

Exemplary embodiments of the invention comprise a method or system for video message recording, delivery, viewing, storage and access on and between modern Internet-accessible mobile devices. Certain implementations may encompass, collectively or in the alternative, real-time push-to-talk functionality, multi-party video chat functionality, as well as peer-to-peer edge content distribution of such video messages for privacy and independence from a central server in cases where video conversion is not required. Particular implementations may allow for universal short and streaming video instant chat across divergent video formats and mobile devices, and data delivery networks that prevent the widespread adoption of video messaging on mobile phone devices.

Certain embodiments may allow a user to record a video message using one or more enabled devices and send the video message to one or more selected recipients with the ease of creating and sending a text message but with increased simplicity of talking and without the added time and distraction of typing. Recipients may, for example, receive a message indicating they received a video message via standard SMS/text. Recipients may then view and hear the video message and be given the option to respond to the sender with a new video message, thereby enabling video messaging dialogue or thread. Preferred implementations may enable users to create, transmit, send, post, and share one or more video messages with one or more recipients or other third parties. Recipients may receive, view, post, and return video message responses to the sender. Particular implementations may enable one or more users, in the aggregate, to conduct unlimited video message conversations and communications at any time and at any place.

Embodiments of the present invention improve the ease, simplicity and speed of creating and sending one or more user-generated videos intended by the user to communicate one or more messages to selected recipients. Embodiments may incorporate one or more algorithms, processes, methods and systems developed exclusively to enable video files to be created, transmitted, received and accessed in real-time over currently available internet bandwidth using currently available internet protocols and mobile communication devices. While video recording on mobile devices has existed for some time, preferred implementations described herein allow universal compatibility between divergent video formats including but not limited to those used by Apple, Inc. (h.264 encoded mp4, m4v, mov), Adobe, Inc. (flv), and other video formats including but not limited to mpeg-1, mpeg-2, avi, as well as previous generation mobile device video formats such as 3gp.

Individuals, business, government, academic institutions and other groups of individuals are able to use embodiments to communicate to individuals and groups of individuals, such as parents messaging children, sales executives messaging a field sales organization, government representatives messaging constituents, municipalities messaging emergency alerts to residents, and teachers messaging students, etc.

Embodiments may enable the user to send short video messages on their mobile devices without the worry of incompatibility of formats for the recipients or video file upload/download issues that has prevented instant and push-to-talk video communications, much as online instant (text) messaging software has done in the last decade. Preferred implementations make video messaging, video push-to-talk, and video instant chat compatible between divergent mobile hardware and varying qualities and speeds of their telecommunications carrier bandwidth speed for data transfers.

Figure 1:
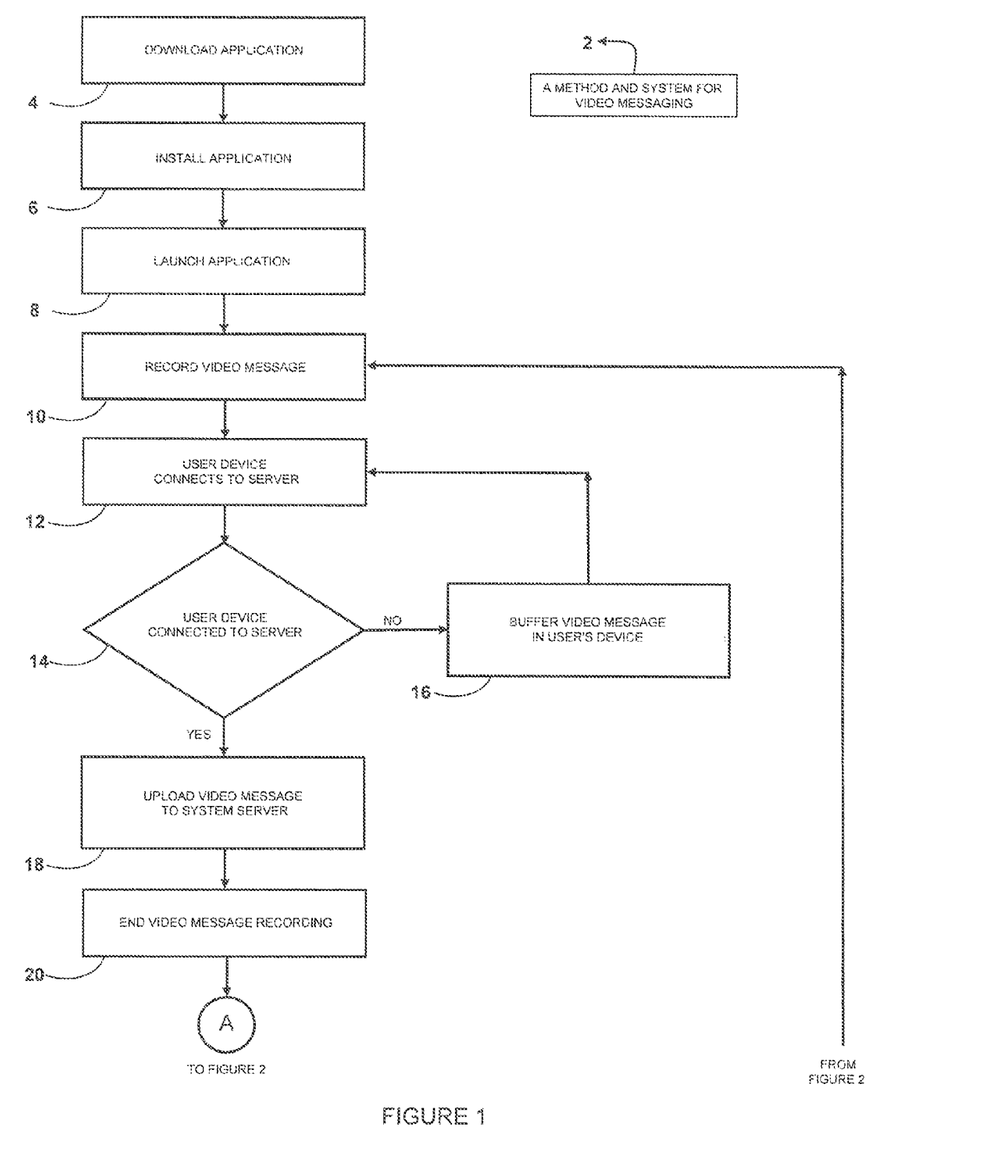
FIG. 1 illustrates an example implementation of steps in which a user may create and store a video message.

Provided below are example steps which are illustrated in FIG. 1, one or more of which may be enabled by certain embodiments of the present invention.

The method 2 describes a method to create, send, receive, and manage video messages and their communication based on interests and decisions of consumers.

Figure 2:
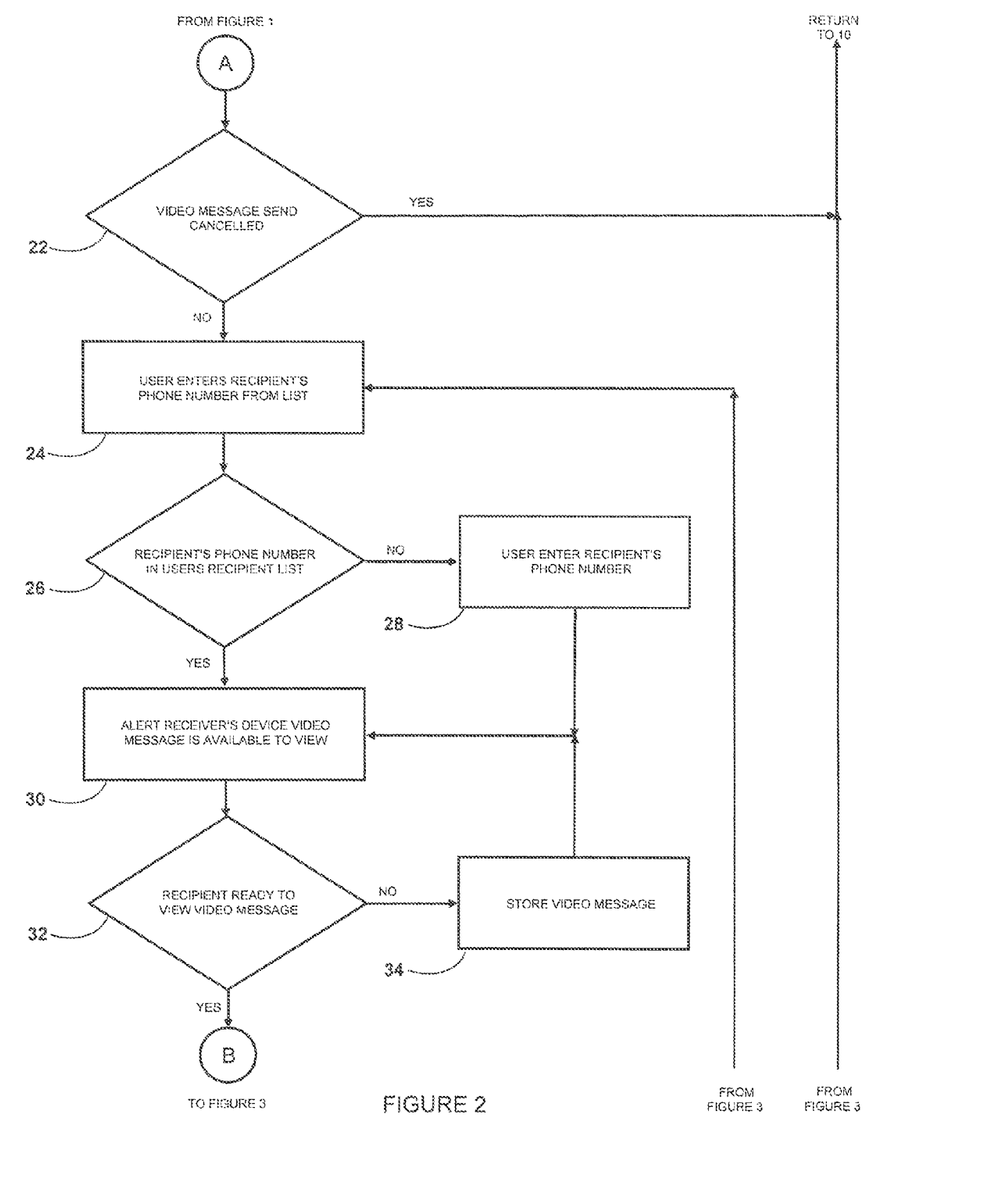
FIG. 2 illustrates an example implementation of steps in which a video message may be recorded and stored.

In the step of Downloading Application 4, the user downloads the invention mobile device application from the inventor's or invention assignees', licensees', or sub licensees' website to enable the users mobile device to create, send and receive video messages;

In the step of Install Application 6, the user may activate the application to install the application on the user's mobile communication device;

In the step of Launch Application 8, the application enables the mobile communication device to create, send and receive video messages;

In the step of Record Video Message 10, the user records a video message using the user's mobile communication device enabled by the invention's video messaging application;

In the step of User Device Connects To Server 12, the user's device seeks and attempts to connect to the invention's servers, comprised of one or more computer communication server devices owned, managed or accessed by the inventors or the invention assignees, licensees, or sub licensees, and located in one or more physical locations;

In the first decision of User Device Connected to Server 14, the invention confirms the user's communication device is connected to the invention server;

In the step of Buffer Video Message in User's Device 16, the video message is temporarily stored in the user's device if the user's device is not connected to the invention's server;

In the step of Upload Video Message to System Server 18, the user's communication device is connected to the invention's server and the user's communication device sends the video to the servers. The servers receive and archive the user's video message;

In the step of End Video Message Recording 20, the user terminates the video message recording when the user determines the video message recording is completed or the user decides to not record and send the video message;

Provided below are example steps which are illustrated in FIG. 2, one or more of which may be enabled by certain embodiments of the present invention.

Figure 3:
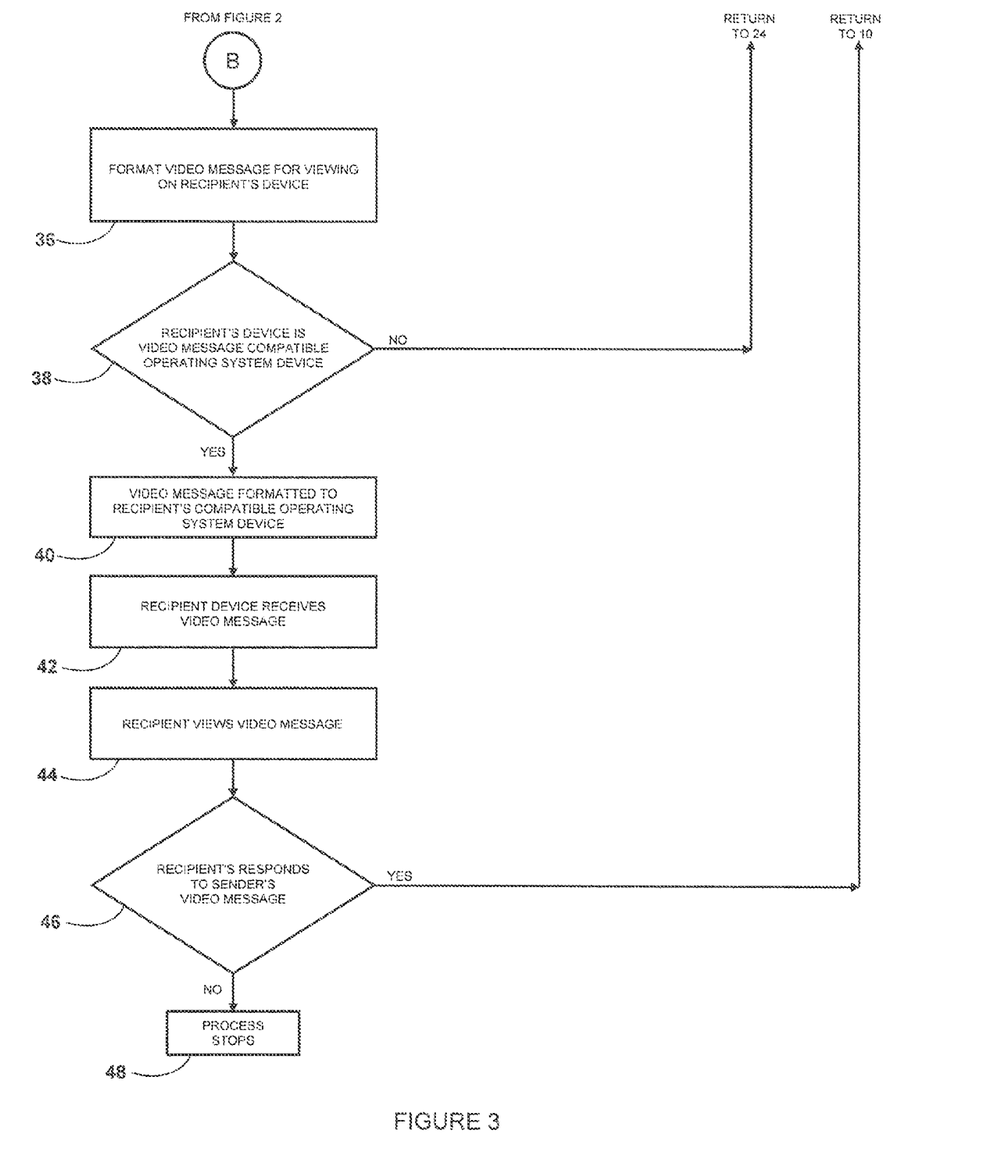
FIG. 3 illustrates an example implementation of steps in which a video message is formatted for viewing, uploaded, viewed, stopped and a reply video message returned.

In the second decision of Video Message Send Cancelled 22, the server terminates the receipt of the video message and enables the user to re-record the video message, not re-record the video message, or record a new video message;

In the step of User Enters Recipient's Phone Number From List 24, the user accesses a phone list of individuals and phone numbers created by the user stored in the user's mobile communication device;

In the third decision Recipient's Phone Number In User's Recipient List 26, the user selects the intended recipient or recipients to whom the user decides to send the newly created video message;

In the step of User Enters Recipient's Phone Number 28, the intended recipient's phone number is not included in the user's phone list and the user manually enters the intended recipient's phone number;

In the step of Alert Recipient's Device 30, the phone number of the intended recipient(s) is transmitted to the invention's servers. The inventions systems, processes, methods and servers confirm the intended user's phone number and sends a message to the intended recipient(s) mobile communication device alerting the intended recipient(s) that a video message has been sent to the intended recipient(s) and the video message is available to view;

In the fourth decision of Recipient Ready To View Video Message 32, the intended recipient selects to view the video message or not view the video message;

In the step of Store Video Message 34, the intended recipient elected to not view the video message and the message is stored for later viewing or deletion at a later time on one or more mobile or nonmobile communication or non-communication devices and the process returns to Step 30 in FIG. 2;

Provided below are example steps which are illustrated in FIG. 3, one or more of which may be enabled by certain embodiments of the present invention.

In the step of Format Video Message For Viewing On Recipient's Device 36, the intended recipient decided to view the received video message and the invention systems, processes, methods and servers prepare to format the video message to be displayed on the recipient's mobile communication device for viewing;

In the fifth decision of Recipient's Device Is Video Message Compatible Operating System Device 38, the server determines if the recipient's mobile communication device operates on the a compatible operating system, including but not limited to iPhone operating system, Android operating system, Blackberry operating system, or other comparable operating system;

In the step of Video Message Formatted To Recipient's Compatible Operating System Device 40, the server confirms the recipient's mobile communication device operates on a compatible video message operating system such as in the example of the iPhone operating system and streams the video message to the recipient's iPhone mobile communication device in a MP4 file formatted for the recipient's mobile communication device, or as in the example of an Android mobile communication device in a Flash file formatted for the recipient's mobile communication device, or as in other comparable compatible operating system devices;

In the step Recipient's Device Receives Video Message 42, the recipient's mobile communication device has received the sender's video message formatted in the recipient's required mobile communications device format.

In the step Recipient Views Video Message 44, the recipient may activate the video message and view the video message;

In the sixth decision of Recipient Responds to Sender's Video Message 46, the intended recipient previously viewed the video message and now decides to respond to the video message sender with a return video message or to not respond to the sender. If the recipient decides to respond to the sender the process returns to step 10 in FIG. 1 thereby enabling the recipient to create and send a return video message to the original sender;

In the final step Process Stops 48, the recipient decides to not respond to the sender's video message and the process stops.

Embodiments may comprise an integrated matrix of methods and systems to create, send, receive, and manage video messages and their communication between one or more users and one or more recipients based on interests and decisions of consumers.

The invention allows and enables users to access the invention for mobile devices from the inventor's or invention assignees', licensees', or sub licensees' website to enable the user's mobile device to create, send and receive video messages. Embodiments may incorporate an application the user accesses and installs on the user's mobile device which enables the user to activate the application and install the application on the user's mobile communication device.

The user is enabled to launch the application on the user's mobile communication device to create, send and receive video messages. The user records a video message using the user's mobile communication device which has been enabled by the invention's video messaging application to create a video message. The invention's servers communicate with the user's device to seek and attempt to connect to the invention's servers, comprised of one or more computer communication server devices owned, managed or accessed by the inventors or the invention assignees, licensees, or sub licensees, and located in one or more physical locations. Once connected to the servers, the invention confirms the user's communication device is connected to the invention server. If the connection is not enabled the video message is buffered in the user's device where the video message is temporarily stored if the user's device is not connected to the invention's server.

When connected, the invention uploads the video message to a system server where the user's communication device is connected to the invention's server and the user's communication device sends the video to the servers. The servers receive and archive the user's video message for distribution to the intended recipient. The user utilizes control "buttons" installed on the user's device to terminate the video message recording when the user determines the video message recording is completed or the user decides to not record and send the video message. When the user terminates the recording the user uses the optional structure to re-record the video message, not re-record the video message, or record a new video message.

When the user decides to send the video message to one or more recipients the user accesses the phone list of individuals and phone numbers created by the user that is stored in the user's mobile communication device. The user may select from the list of individuals and phone numbers the intended recipient or recipients to whom the user decides to send the video message. Embodiments may enable the user to click on the selected recipient or recipients. When selected the systems, processes, methods and servers in accordance with the invention confirms the intended user's phone number and sends a message to the intended recipient(s) mobile communication device alerting the intended recipient(s) that a video message has been sent to the intended recipient(s) and the video message is available to view. If the intended recipient or recipients phone number are not listed in the user's device individual and phone number list the embodiment may enable the user to manually enter the intended recipient or recipients phone number.

For the recipient to view the video message, the recipient's phone number may be transferred to server elements which may then send a message to the recipient's device alerting the recipient that a video message has been sent and is ready for view, thus allowing the recipient to view the video message or not view the video message. If the intended recipient elects to not view the video message the system servers may store the message for later viewing or deletion at a later time.

If the intended recipient elects to view the video message, the video message is formatted in one or more formats that enable the message to be displayed on the recipient's mobile communication device for viewing that include but are not limited to iPhone operating system, Android operating system, Blackberry operating system, or other comparable operating system. For example, if the system determines that the recipient's device operates on an iPhone operating system or compatible system the video message may be streamed to the recipient's iPhone mobile communication device in a MP4 file formatted for the recipient's mobile communication device.

In another example, if the recipient's device operates on an Android operating system or compatible system, embodiments typically enable the video message to be streamed to the recipient's Android mobile communication device in a Flash file formatted for the recipient's mobile communication device. Embodiments typically enable the recipient to accesses the video message on the recipient's device to view the sender's video message. Embodiments typically subsequently enable the recipient to return a video message to the sender, store the video message for later viewing or deletion, or delete the video message using the recipient's device. In the instance when the recipient elects to delete the video message, immediately or after storage, they may delete the message from the recipient's device and from any respective server element.

Embodiments of the invention may comprise various hardware and software elements, including but not limited to: One or more mobile communication devices used by the originator(s) of a video message, i.e. sender(s); One or more mobile communication devices used by the recipient(s) of a video message, i.e. receiver(s); One or more mobile device applications installed on the mobile communication devices to facilitate the sending and receiving of video messages; One or more server elements running, for example, server applications. Depending upon the particular embodiment, the respective computer programs may be divided between server applications and mobile device applications.

In creating a video message, an individual may for example hold a mobile communication device that includes a camera lens, microphone, video and audio recording capabilities, such as an iPhone or Android mobile telephone, pointing that device at themselves or a different direction, press a "record" button on the device to activate the initiate the video recording, and speak to record a video message. The user may then stops recording when they feel their video message is completed.

The user may select who they want to send the video message to from, for example, a list of phone numbers in the user's mobile device (or manually enters one or more phone numbers for intended recipients). The user may click a "send" button on their device to initiate the sending of the message to the intended recipient or recipients. The methods, processes, and systems may manage the video message communication from the sender to the intended recipient(s). The recipient(s) may, for example, receive a message stating that they received a video message from a sender.

The video message is received: The recipient elects to view, store or delete the message. If the recipient elects to view the message the video message is uploaded to the recipient's device for the recipient to view the video message. The recipient may elects to delete the message or return a message. The process may be repeated if the recipient records and sends a video message response to the video message sender or to one or more third parties, or both.

Figure 4:
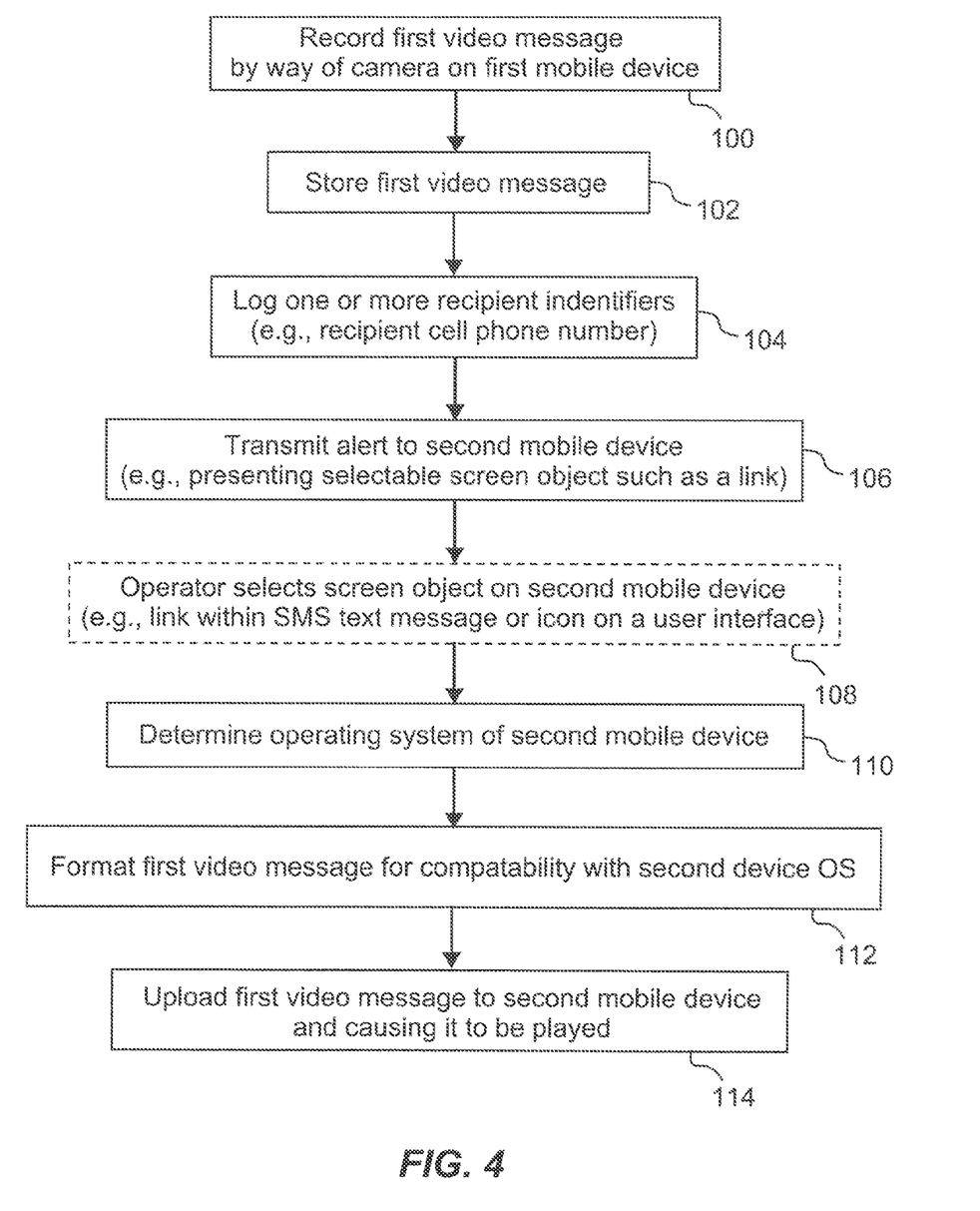
FIG. 4 illustrates an example implementation of a series of steps, instructions for which may be provided in one or more computer programs and executed by way of a mobile device, one or more server elements, or a combination thereof.

A non-transitory computer-readable medium may store one or more computer programs for creating and communicating a video message between a plurality of mobile devices. Referring to FIG. 4 for illustration, the one or more computer programs may comprise instructions for performing a series of steps, embodiments of one or more of which are described below.

In step 100, a first video message may be recorded by way of, for example, a camera element on a first mobile device. In step 102, the first video message may be stored in memory, for example, on the first mobile device or on a server element. In step 104, a recipient identifier may be logged upon choosing of the recipient identifier by an operator of the first mobile device. The recipient identifier is typically associated with an operator of a second mobile device. In step 106, an alert may be transmitted to the second mobile device by way of the respective recipient identifier. The alert is typically configured to provide notification to the operator of the second mobile device that the first video message is available for viewing and to present a selectable screen object on the screen of the second mobile device. The selectable screen object may be, for example, a web link within an SMS text message or a clickable icon presented in a copy of the mobile device application installed on the second mobile device. When the screen object is in the form of a graphic icon, the icon may represent executable code.

As shown in step 108, the operator of the second mobiles device may choose, at their convenience, to select the screen object. As illustrated in step 110, in particular embodiments, the operating system running on the second mobile device is determined, for example, as otherwise described herein. In step 112, the first video message may be formatted so that it is natively compatible for viewing by way of the operating system of the second mobile device.

In certain embodiments, the step of uploading 114 is triggered substantially upon a selection of the screen object by an operator of the second mobile device. In particular embodiments, the alert is transmitted in the form of an SMS text message. In some embodiments, the recipient identifier may be a phone number associated with the second mobile device. Alternatively or in addition, the recipient identifier may be an email address associated with an email account accessible by way of the second mobile device, or a message address associated with a social network account accessible by way of the second mobile device.

In particular embodiments, of a non-transitory computer-readable medium, the steps of recording, logging, transmitting determining, formatting and uploading are all performed on the mobile device from which the video message is being sent, such as the first mobile device. In such embodiments, at least portions of the one or more computer programs are typically configured to be installed and to operate on the first mobile device, in the form of, for example, a mobile device application. In particular such embodiments, for example, the one or more computer programs may further comprise instructions for providing a video message user interface on at least the first mobile device.

In certain embodiments of non-transitory computer-readable medium the one or more computer programs further comprise instructions for downloading the first video message from the first mobile device to one or more server elements, for example, for storage and archiving thereon. In particular embodiments involving one or more server elements, the steps of transmitting, determining, formatting and uploading may be performed by way of one or more of the server elements. In particular embodiments adapted to instruct the step of downloading, the instructions may be configured to enable the step of downloading to be performed substantially concurrently with the step of recording if, during the step of recording 100, a communication connection is established between the one or more server elements and the first mobile device.

In particular embodiments, in which a mobile device application may be installed for operation on both the first and second mobile devices, the one or more computer programs further comprise instructions for steps which allow a recipient to create and send a reply video message. Such steps may include viewing the first message video on the second mobile device and recording a reply video message by way of a camera element on the second mobile device. A reply alert may then be transmitted to the operator of the first mobile device. The reply alert may be configured to provide notification to the operator of the first mobile device that the reply video message is available for viewing, and to present a selectable reply screen object on the first mobile device. The operating system of the first mobile device may be determined. The reply video message may then be formatted, if necessary, so that it is natively compatible for viewing by way of the operating system of the first mobile device. The reply video message may be uploaded to the first mobile device and caused to be played thereon if at least the screen object has been selected by an operator of the first mobile device. Depending on the device configuration, the operator of the first and second mobile devices may be queried by the respective operating system before the device will play the video.

Particular preferred embodiments provide for the logging of more than one recipient identifier to enable sending the video message to a plurality of second mobile devices. In such an embodiment, the one or more computer programs comprising instructions for the following steps: recording a first video message from a camera element on a first mobile device; logging one or more recipient identifiers, each recipient identifier being associated with a respective one of one or more respective second mobile devices, wherein the one or more recipient identifiers are chosen by an operator of the first mobile device; transmitting an alert to each of the one or more second mobile devices by way of the respective recipient identifiers, wherein the alert provides notification to operators of the one or more second mobile devices that the first video message is available for viewing, and presents a selectable screen object on the one or more second mobile devices; determining the operating systems of each of the second mobile devices; formatting the reply video message so that it is natively compatible for viewing by way of the respective operating systems of the one or more second mobile devices; and for each of the one or more second mobile devices in which an operator has selected the screen object, uploading the first video message to the respective second mobile devices and causing it to be played thereon.

An embodiment of a method for creating and communicating a video message between a plurality of mobile devices may comprise the following steps: recording a first video message by way of a camera element on a first mobile device; logging a recipient identifier, the recipient identifier being associated with an operator of a second mobile device, wherein the recipient identifier is chosen by an operator of the first mobile device; transmitting an alert to the second mobile device by way of the respective recipient identifier, wherein the alert is configured to provide notification to the operator of the second mobile device that the first video message is available for viewing, and to present a selectable screen object on the second mobile device; determining the operating system of the second mobile device; formatting the first video message so that it is natively compatible for viewing by way of the operating system of the second mobile device; and uploading the first video message to the second mobile device and causing it to be played thereon if at least the screen object has been selected by an operator of the second mobile device.

An embodiment of a first mobile device may comprising one or more processors; a first device memory; a camera element; and a non-transitory computer-readable medium storing instructions for execution by the one or more processors, the instructions comprising instructions for: recording a first video message by way of the camera element; storing the first video message in the first device memory; logging a recipient identifier, the recipient identifier being associated with an operator of a second mobile device, wherein the recipient identifier is chosen by an operator of the first mobile device; transmitting an alert to the second mobile device by way of the respective recipient identifier, wherein the alert is configured to provide notification to the operator of the second mobile device that the first video message is available for viewing, and to present a selectable screen object on the second mobile device; determining the operating system of the second mobile device; formatting the first video message so that it is natively compatible for viewing by way of the operating system of the second mobile device; and uploading the first video message to the second mobile device and causing it to be played thereon if at least the screen object has been selected by an operator of the second mobile device. In certain such embodiments, the instructions may include the step of, prior to the step of uploading, detecting when the first mobile device is in real-time communication with the second mobile device.

In certain preferred embodiments, the first mobile device records and streams the video message to a central computer system (e.g., cloud) where it is stored until the second mobile device is ready to receive and play it. It may also be this central computer system that determines the operating system of the second mobile device and modifies the video format to suit.

Certain implementations of the invention may incorporate one or more components integrated to manage the method or process to operate the invention. For example, particular embodiments may include one or more of a first server element, a second server element, a third server element, or some combination thereof.

A first server element may include one or a series of video processing servers. Such video processing serves may be, for example, 1U Video Processing Servers (VPS) with a minimum of Intel dual-core 3.0 GHz or higher, 6 or more GB of memory and 250 GB hard drive storage devices in RAID 1 configuration running 64-bit Centos 5.6 Linux Operating System. The VPS may have installed a combination of open source video codecs and FFMPEG for real time video conversions. A VPS may also have installed open source Apache 2 web server which contains scripts written in PHP 5 to handle inter-compatibility processing requirements. Lastly, installed on the VPS may be a video streaming software from, for example, Wowza Media for streaming purposes.

A second server element may include one or a series of video storage servers. The video storage servers may be, for example, 1U Video Storage Servers (VSS) with a minimum of Intel dual-core 3.0 GHz or higher, 6 or more GB of memory and 250 GB hard drive storage devices in RAID 1 configuration running 64-bit Centos 5.6 Linux Operating System. The VSS may be used primarily as the video delivery, viewing, and serving of video messages sent from the application software on an individual's Internet-accessible device. The VSS may have installed, for example, open source Railo application server along with PHP5 and Apache 2 web server to facilitate delivery of video content to a recipient mobile device.

A third server element may include one or a series of application download servers. The application download servers may be, for example, 1U Application Download Servers (ADS) with a minimum of Intel dual-core 3.0 GHz or higher, 6 or more GB of memory and 250 GB hard drive storage devices in RAID 1 configuration running 64-bit Centos 5.6 Linux Operating system. The ADS may be used as a backup mirror server for downloads of the mobile device applications, available through appropriate outlets such as the Amazon App Marketplace, Android Marketplace, Apple App Store, and other application outlets as appropriate for supported device Operating Systems.

In particular embodiments, one or more of the computer programs may be included in a mobile software application configured for installation and operation on end-user mobile devices. Such mobile software applications may be written, for example, using one or more application development tools including but not limited to Adobe Air and compiled to one or more runtime codes compatible with one or more supported Operating Systems including but not limited to Apple iOS, Android OS, Blackberry OS, HP webOS, Samsung SmartTV OS, Microsoft Windows OS, Mac OS X, Sony PlayStation 3, Nintendo Wii, and other comparable video message compatible operating systems.

Particular implementations may incorporate one or more of the following features: algorithms tuned for multi-device, multi-Operating System, multi-platform, multi over-the-air telecommunications data bandwidth speeds from various carriers. Embodiments may provide users the ability to directly send a video message across the global Internet network without need for the end user's phone number, IP address, or any other info, other than having the invention installed on the individual's mobile device.

Particular embodiments, may enable peer-to-peer distributed content delivery, or edge network features that allow a user's video message to be sent to its destination without a central server in cases where video format conversion is not required. Distributed peer-to-peer nature of the video distribution may effectively allow some embodiments to spread the video content into multiple parts to its nearest peers, until it reaches its destination for recipient viewership.

Certain embodiments may employ algorithms configured to allow for a unique push-to-talk, multi-party real time video communication using existing telecommunication carrier data network speeds, as slow as 3G and above.

In preferred embodiments, the mobile device application may enable a plurality of mobile devices to both send and receive video messages, for example, in the same thread. At least some of the computer programs which are elements of the invention discussed herein may form server applications which are installed and implemented on one or more server elements. For example, a server element may run one or more server applications for detecting compatible device operating systems and formatting a video message to ensure its compatibility with the device's compatible operating system. One or more server elements may store a mobile device application for upload to one or more mobile devices to operate thereon, wherein the mobile device application may be formatted for compatibility with the specific operating system of the respective downloading mobile communication device. The server elements, user and recipient mobile devices may be interconnectable by way of compatible internet protocols.

Particular alternative embodiments may include a system and method of real-time universal mobile video chat and video message delivery system, made possible through the VPS, VSS, and ADS hardware, along with the software component installed on a user's Internet accessible device. Further embodiments may include: (a) private encrypted video messaging that is only viewable with an appropriate password, (b) near field communication between mobile device and invention to enable video-based consulting commerce, (c) in-app payments for premium video delivery in a distributed peer-to-peer manner, and (d) location-based video advertisement delivery by way of the systems and methods for the video delivery described herein.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A non-transitory computer-readable medium storing one or more computer programs for creating and communicating a video message between a plurality of mobile devices, the one or more computer programs comprising instructions for:
   recording a first video message by way of a camera element on a first mobile device;
   storing the first video message in the first mobile device;
   logging a recipient identifier, the recipient identifier being associated with an operator of a second mobile device, wherein the recipient identifier is chosen by an operator of the first mobile device;
   transmitting an alert to the second mobile device by way of the respective recipient identifier, wherein the alert is configured to provide notification to the operator of the second mobile device that the first video message is available for viewing, and to present a selectable screen object on the second mobile device;
   determining the operating system of the second mobile device;
   formatting the first video message so that it is natively compatible for viewing by way of the operating system of the second mobile device; and
   uploading the first video message to the second mobile device and causing it to be played thereon if at least the screen object has been selected by an operator of the second mobile device;
   wherein the steps of recording, logging, transmitting, determining, formatting and uploading are all performed on the first mobile device.

2. A first mobile device comprising:
   one or more processors;
   a first device memory;
   a camera element; and
   a non-transitory computer-readable medium storing instructions for execution by the one or more processors, the instructions comprising instructions for:
   recording a first video message by way of the camera element;
   storing the first video message in the first device memory;
   logging a recipient identifier, the recipient identifier being associated with an operator of a second mobile device, wherein the recipient identifier is chosen by an operator of the first mobile device;
   transmitting an alert to the second mobile device by way of the respective recipient identifier, wherein the alert is configured to provide notification to the operator of the second mobile device that the first video message is available for viewing, and to present a selectable screen object on the second mobile device;
   determining the operating system of the second mobile device;
   formatting the first video message so that it is natively compatible for viewing by way of the operating system of the second mobile device; and
   uploading the first video message to the second mobile device and causing it to be played thereon if at least the screen object has been selected by an operator of the second mobile device.

3. The non-transitory computer-readable medium of claim 2, wherein the instructions further comprise instructions to:
   prior to the step of uploading, detecting when the first mobile device is in real-time communication with the second mobile device.

4. A non-transitory computer-readable medium storing one or more computer programs for creating and communicating a video message between a plurality of mobile devices, the one or more computer programs comprising instructions for:
   recording a first video message by way of a camera element on a first mobile device;
   logging a recipient identifier, the recipient identifier being associated with an operator of a second mobile device, wherein the recipient identifier is chosen by an operator of the first mobile device;
   transmitting an alert to the second mobile device by way of the respective recipient identifier, wherein the alert is configured to provide notification to the operator of the second mobile device that the first video message is available for viewing, and to present a selectable screen object on the second mobile device;
   determining the operating system of the second mobile device;
   formatting the first video message so that it is natively compatible for viewing by way of the operating system of the second mobile device; and
   uploading the first video message to the second mobile device and causing it to be played thereon if at least the screen object has been selected by an operator of the second mobile device;
   wherein the steps of recording, logging, transmitting determining, formatting and uploading are all performed on the first mobile device.

* * * * *